(12) United States Patent
Tingey et al.

(10) Patent No.: US 7,133,597 B2
(45) Date of Patent: Nov. 7, 2006

(54) RECORDING AUDIO ENABLING SOFTWARE AND IMAGES ON A REMOVABLE STORAGE MEDIUM

(75) Inventors: Susan T. Tingey, Rochester, NY (US); Paul B. Gilman, Penfield, NY (US); Kenneth A. Parulski, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1254 days.

(21) Appl. No.: 09/898,813

(22) Filed: Jul. 5, 2001

(65) Prior Publication Data

US 2003/0012557 A1   Jan. 16, 2003

(51) Int. Cl.
*H04N 5/91* (2006.01)
*H04N 5/253* (2006.01)

(52) U.S. Cl. .......................................... 386/96; 348/96

(58) Field of Classification Search ............ None
See application file for complete search history.

(56) References Cited

U.S. PATENT DOCUMENTS

| | | | |
|---|---|---|---|
| 4,969,204 A | 11/1990 | Jones et al. | |
| 5,050,230 A | 9/1991 | Jones et al. | |
| 5,218,455 A | 6/1993 | Kristy | |
| 5,227,789 A | 7/1993 | Barry et al. | |
| 5,359,374 A | 10/1994 | Schwartz | |
| 5,365,686 A | 11/1994 | Scott | |
| 5,432,906 A | 7/1995 | Newman et al. | |
| 5,461,492 A | 10/1995 | Jones | |
| 5,477,264 A | 12/1995 | Sarbadhikari et al. | |
| 5,530,501 A | 6/1996 | Bell | |
| 5,555,042 A | 9/1996 | Jones et al. | |
| 5,555,098 A | 9/1996 | Parulski | |
| 5,565,912 A | 10/1996 | Easterly et al. | |
| 5,574,519 A | 11/1996 | Manico et al. | |
| 5,595,389 A * | 1/1997 | Parulski et al. ............... 463/31 |
| 5,609,978 A | 3/1997 | Giorgianni et al. | |
| 5,828,406 A | 10/1998 | Parulski et al. | |
| 6,084,582 A | 7/2000 | Qureshi et al. | |
| 6,208,770 B1 * | 3/2001 | Gilman et al. ............... 382/305 |
| 6,462,753 B1 * | 10/2002 | Koyata et al. ............... 715/716 |
| 6,839,059 B1 * | 1/2005 | Anderson et al. ........... 345/501 |
| 6,990,293 B1 * | 1/2006 | Hu ............................... 396/311 |

FOREIGN PATENT DOCUMENTS

| | | |
|---|---|---|
| EP | 0 913 989 | 5/1999 |
| EP | 0 987 880 | 3/2000 |
| EP | 1 028 583 | 8/2000 |

* cited by examiner

*Primary Examiner*—Thai Tran
*Assistant Examiner*—Heather R. Jones
(74) *Attorney, Agent, or Firm*—Raymond L. Owens

(57) ABSTRACT

A method of recording audio enabling software and images on a removable storage medium including providing a plurality of digital files representing colored digital images, transferring such digital files onto the removable storage medium, and providing audio enabling software and transferring such software onto the removable storage medium.

8 Claims, 6 Drawing Sheets

RECORDING AUDIO ENABLING SOFTWARE AND IMAGES ON A REMOVABLE STORAGE MEDIUM

CROSS REFERENCE TO RELATED APPLICATIONS

Reference is made to commonly assigned U.S. patent application Ser. No. 09/141,686 filed Aug. 28, 1998, entitled "Selecting, Arranging, and Printing Digital Images From Thumbnail Images" to Bubie et al., the disclosure of which is incorporated herein by reference.

FIELD OF THE INVENTION

This invention relates to recording audio enabling software and images on a removable storage medium.

BACKGROUND OF THE INVENTION

Digital colored images can be produced by electronic still cameras. Analog signals from an image sensor are converted into digital signals, processed, and combined with "metadata" (such as the date the picture was taken and camera settings) in a digital file. There are many storage devices on which these digital images can be stored, including floppy magnetic discs, magnetic hard disc drives, optical discs including write-once discs, digital tape, and Flash EPROM cards. Some digital cameras, such as the Kodak DC265 camera, allow audio to be recorded along with the digital images. The audio is stored as "metadata" within the digital image file. These images may later be downloaded to a host computer, viewed, and printed using a local printer, such as a color inkjet printer. The audio files may be played back as the images are reviewed on the camera's LCD display, or may be played as the images are later viewed on the user's desktop or portable computer.

In another approach to providing digital colored images, a photographic film is scanned, digitized and converted to a digital file corresponding to each film image. The Kodak PhotoCD™ system is an example of one such arrangement for scanning, digitizing, and providing a digital file for each image. Often, a user will have a service that will scan and digitize images to provide a digital file. These files are provided on a removable storage media, such as a Kodak PhotoCD disc. A user may also purchase software programs (application software) which operates on these image files. These applications permit the customer to access, view, modify, and/or print the image files as desired. Adobe Photoshop™ is an example of software that can operate on digital image files to drive a printer for producing output images. The applications that operate on the images to produce prints, such as Photoshop, are provided separately, rather than on the same PhotoCD disc that stores a customer's film images. As a result, it is difficult for an unskilled user to load the appropriate software into their host computer, launch the application (e.g. Photoshop) and then open the desired images from the PhotoCD, one at a time, in order to select and print images on their home printer.

An additional problem with capturing images on film is that there is currently no convenient method for providing audio with the images. It is possible to record audio information in a film camera, for example using the approach described in U.S. Pat. No. 5,530,501 to Bell, but this approach significantly increases the cost of the film camera and is not currently supported by photofinishers. It is also possible to store audio information for a single image as part of a picture frame, as described in U.S. Pat. No. 5,359,374 to Schwartz, or as part of a picture holder as described in U.S. Pat. No. 5,365,686 to Scott, or as part of a photoalbum, as described in U.S. Pat. No. 5,574,519 to Manico et. al. However, all of these approaches require special equipment and none allow the recorded audio to be played back on a user's home computer or to be provided along with digital image files.

It is known to provide a CD containing both still image files and audio files, as described in commonly assigned U.S. Pat. No. 5,555,098 to Parulski et al., the disclosure of which is incorporated herein by reference. As shown in FIG. 1 of U.S. Pat. No. 5,555,098, the audio is recorded at the same time that the image files are recorded onto the CD. As a result, the user needs to provide a tape of audio information to the photofinisher for recording onto the CD as the images are scanned and recorded, or else the user needs to be present during the film scanning operation in order to record audio information. Both approaches are very inconvenient for the user. The CD described in U.S. Pat. No. 5,555,098 does not contain any enablement software of any type for recording audio at a later time.

SUMMARY OF THE INVENTION

It is an object of the present invention to provide an effective way of producing high quality digital images that can be viewed or printed while listening to associated audio information.

Another object of this invention is to provide a simple method for a user to record audio information that is associated with images on a removable storage medium.

Another object is to provide an arrangement that makes it possible for a new computer user to simply and easily view their personal digital images provided on a recordable optical disc using their computer, record associated audio information onto the optical disc or a second optical disc, and then enable others to view the digital images while listening to the associated audio information.

These objects are achieved by a method of recording audio enabling software and images on a removable storage medium, comprising the steps of:

a) providing a plurality of digital files representing colored digital images;

b) transferring such digital files onto the removable storage medium; and c) providing audio enabling software and transferring such software onto the removable storage medium.

ADVANTAGES

An advantage of the present invention is to provide an effective way of recording audio information associated with digital image files Another advantage of this invention is to provide a simple method for a user to record audio information that is associated with images on a removable storage medium, by providing enabling software on a removable storage medium containing digital image files.

Another advantage of this invention is to provide a recordable optical disc with digital images and enabling software that allows the user to record audio information back onto the same recordable optical disc.

DETAILED DESCRIPTION OF THE INVENTION

Figure 1:
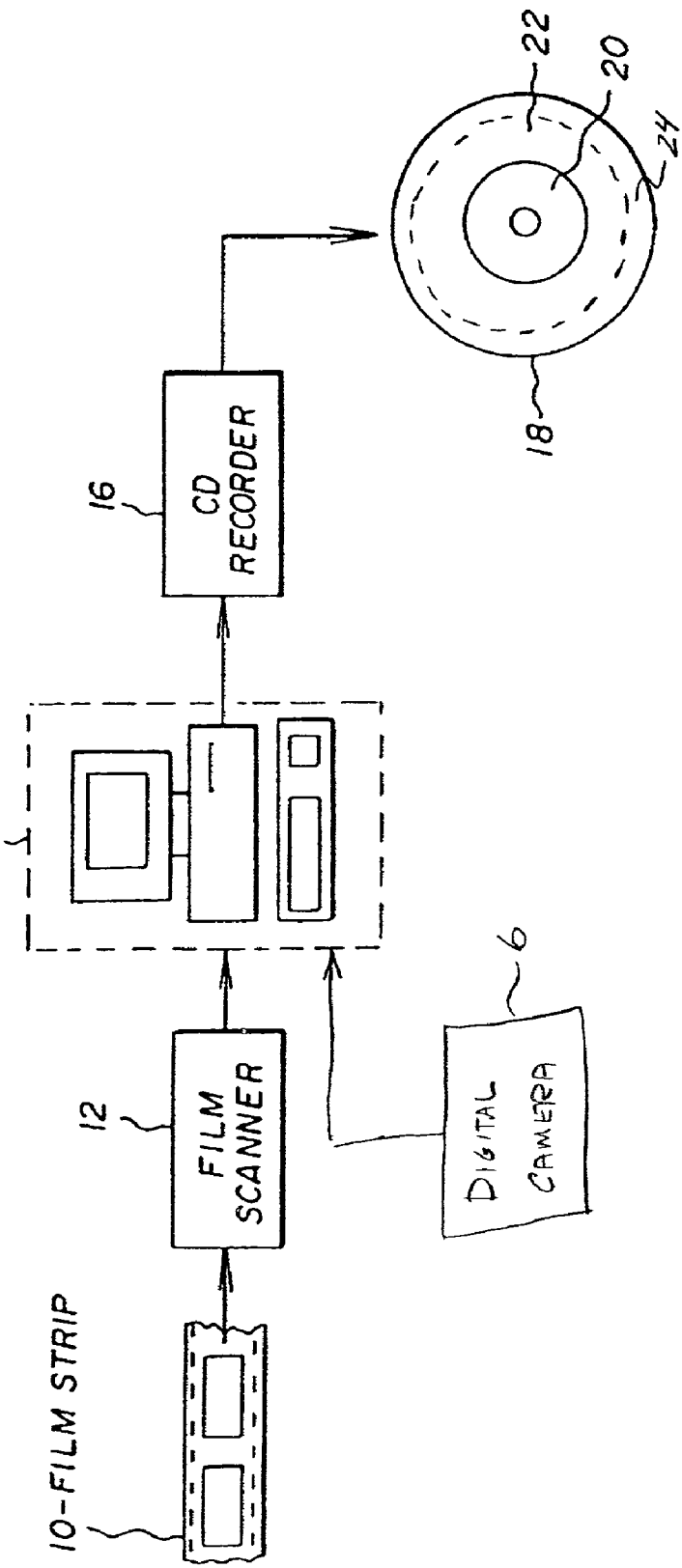
FIG. 1 illustrates a system which can be used for scanning a color film, storing a color adjusted scanned image on a storage medium and also storing audio and printing enabling software on the same medium.

FIG. 1 illustrates a system which can be used for scanning a color film, storing a color adjusted scanned image on a storage medium and also storing audio recording and printing enabling software on the same medium. More specifically, a photographic original such as a film negative or a slide 10 is scanned by a scanning device 12. The scanning device 12 produces a colored digital image having a number of pixels, for example 3072 columns by 2048 rows of red, green, and blue pixel values. Scanners that can be used in accordance with the invention are well known in the art, as described in commonly assigned U.S. Pat. Nos. 5,218,455, 5,461,492, 5,555,042, and 5,565,912, the disclosures of which are incorporated herein by reference. Alternatively, digital image signals can be provided from a digital camera 6, as described in commonly assigned U.S. Pat. Nos. 5,828, 406 and 5,477,264, the disclosures of which are incorporated herein by reference.

The digital image signals from the scanner 12 or digital camera 6 are provided to a computer workstation 14. These digital image signals are color adjusted and temporarily stored or passed directly to a CD recorder 16 by the operation of the workstation 14. The CD recorder 16 causes the color adjusted digital image data 22 to be recorded on a write-once compact disc 18, along with software 20 to enable audio recording and image printing. Alternately, a hybrid compact disc may be used. Such a hybrid disc is described in U.S. Pat. No. 5,595,389, the disclosure of which is incorporated herein by reference. In the present invention, the enabling software 20 is prepressed at the time the disc is manufactured, and the digital images 22 are written to the disc as the film is scanned. The enabling software 20 enables the user to subsequently record audio information 24 to any image on the disc 18.

Figure 2:
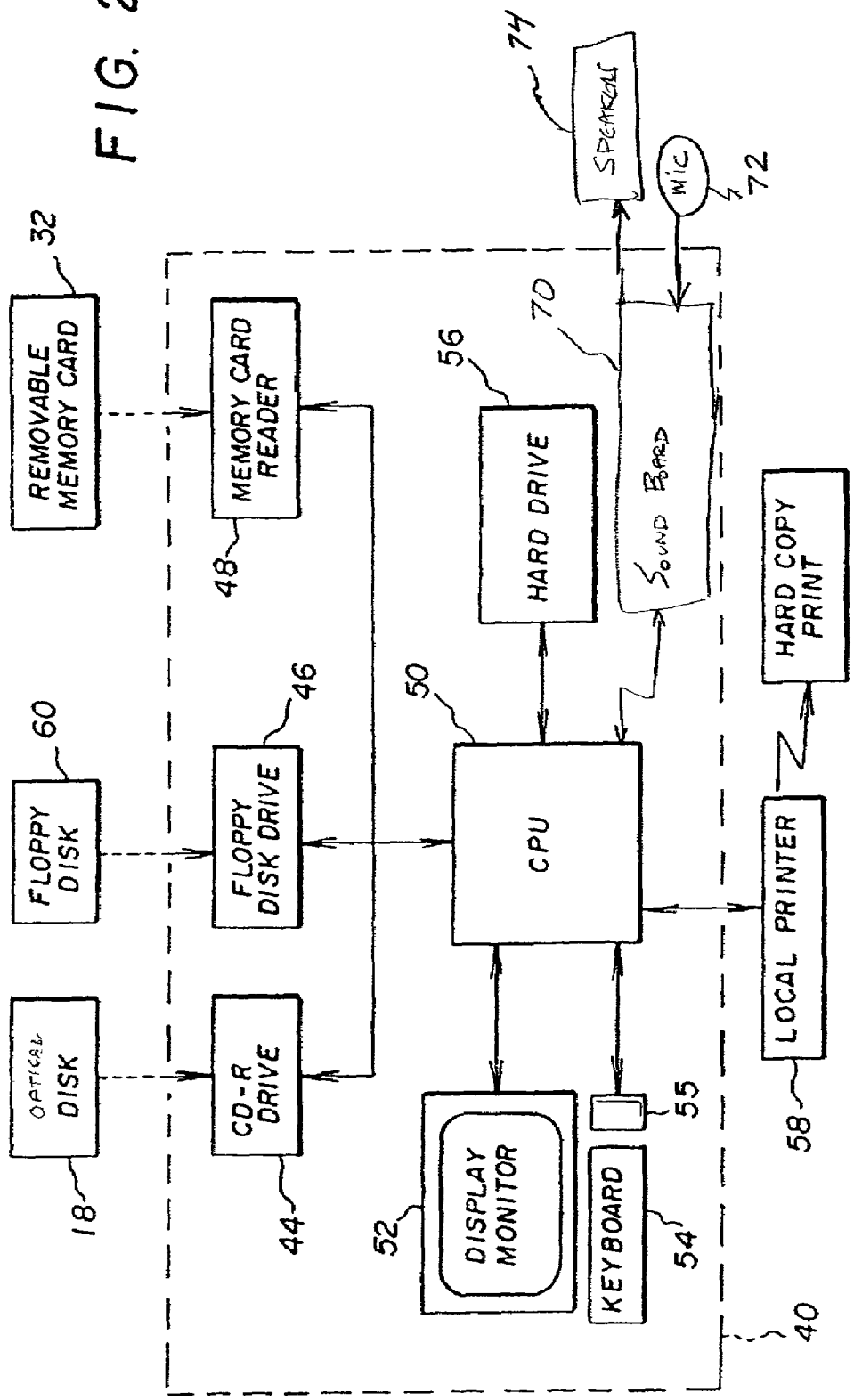
FIG. 2 illustrates a system that can be used for viewing and printing the images from compact disc, and for recording audio information onto the compact disc, using the software contained on compact disc.

FIG. 2 illustrates a system which can be used for viewing and printing the digital images 22 from compact disc 18, and for recording and playing audio information 24, using the enabling software 20 contained on compact disc 18. The print enabling software can utilize the methods described in U.S. Pat. No. 6,208,770 to Gilman et al., the disclosure of which is incorporated herein by reference.

The compact disc 18, which can be a write once (CD-R) disc, is inserted into CD-R drive 44 in a host computer 40, in order to enable the information to be read from the CD 18, and for the audio information 24 to be recorded onto the CD 18. Alternatively, the images 22 and enabling software 20 can be stored on a floppy magnetic disc medium 60. This floppy disc 60 is inserted into a floppy disc drive 46. Alternatively, the images 22 and enabling software 20 can also be provided on a removable memory card 32 such as a Flash EPROM memory card, that can be inserted into memory card reader 48.

A computer processing unit (CPU) 50 will be understood to use the enabling software 20 in accordance with the present invention that will be described in more detail in FIGS. 3–6. This enabling software 20 can be downloaded from the compact disc 18, floppy disc 60, or removable memory card 32 and installed on a hard drive 56. The CPU 50 is directly coupled to a display monitor 52 and a keyboard 54. A mouse 55 permits the user to readily communicate with the CPU 50. The CPU 50 is in direct communication with a local printer 58 that can produce a hard copy print. The CPU 50 is also in direct communications with a sound board 70 that receives an audio input signal from a microphone 72 and provides audio output signals to one or more speakers 74.

Figure 3:
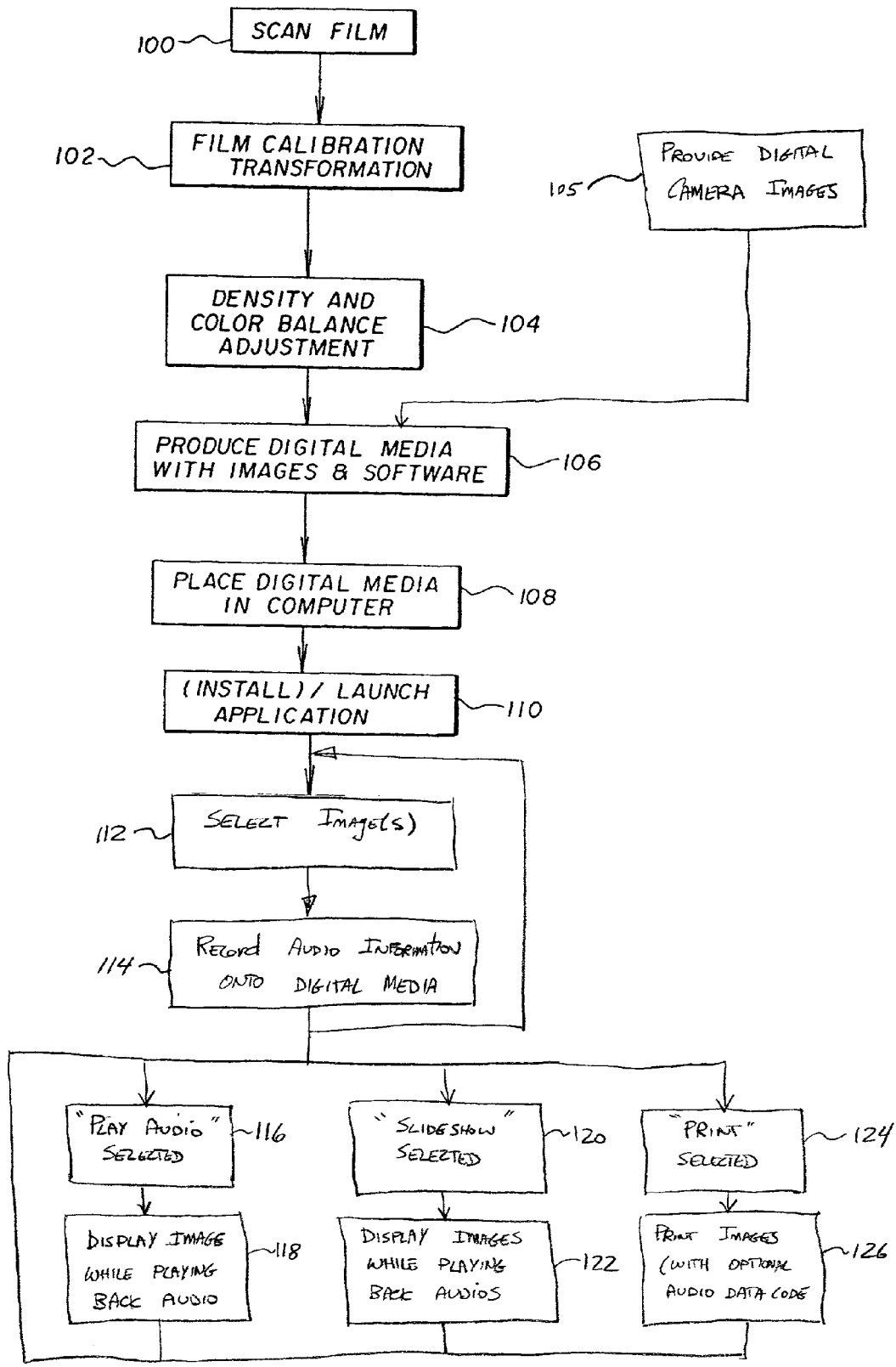
FIG. 3 is a flow chart of a method of recording audio information using a storage medium having digital images and audio enabling software

Turning now to FIG. 3 which depicts a block diagram of a process in accordance with the present invention. In block 100, the film is scanned by film scanner 12 in FIG. 1. In block 102, a film calibration transformation is performed. One feature of the present invention is that the scanned colored digital images stored on the media in block 106 are provided in a proper image data metric as described in commonly assigned U.S. Pat. Nos. 5,609,978 and 5,432,906, the disclosures of which are incorporated herein by reference. In order to provide the proper image data metric, the film scanner 12 must be calibrated for the particular film. This film calibration transformation 102 is implemented in workstation 14 to convert a properly exposed digital film image to the proper image data metric. If the film image was under or over exposed, or was not taken under the normal film illumination condition (e.g. daylight balanced film taken under tungsten light), the image is further density and color balance adjusted in block 104 to correct for these conditions, as well as for any other conditions due to non-ideal film manufacturing or keeping problems. Automatic algorithms that provide this correction are well known in the art, and are accomplished in a conventional Kodak PhotoCD system. See, for example, commonly assigned U.S. Pat. Nos. 4,969,204, 5,505,230, and 5,227,789, the disclosures of which are incorporated herein by reference. Furthermore, though not listed in FIG. 3, other image processing functions can also be performed, such as image sharpening and compression.

The color adjusted digital file is then stored to the digital media (e.g. the optical disc 18 in FIG. 1) in block 106 along with enabling software 20. The enabling software 20 includes an application program that allows users to view the images and to record associated audio information for one or more images back onto the digital media. As an alternative to the film input process described in blocks 100, 102 and 104, digital images can alternatively be provided from a digital camera in block 105. Blocks 100 through 106 are normally performed by a service provider, such as a photofinisher. The photofinisher scans a customer's film strip 10 and provides the optical disc 18, along with the developed film strip 10 and possibly hard copy prints, to the customer.

In block 108, the customer places the optical disc 18 into the CD-R drive 44 of their computer 40, which is typically a home desktop computer. Alternatively, if the photofinisher provided a floppy disc 60 or removable memory card 32 instead of an optical disc, the removable storage medium is inserted into the proper reader 46, or 48 in computer 40, shown in FIG. 2.

When the removable storage media, for example compact disc 18, is inserted into the computer system 40 via CD-R drive 44, the enabling software 20 may be automatically installed and launched, as will be described in more detail below with reference to FIG. 4. In block 110, if the enabling software 20 has already been installed on the computer 40, the software application is launched so that the color adjusted digital images on the compact disc 18 are accessible by the software for immediate viewing, printing, audio recording, and audio playback. If the enabling software 20 has not been installed on the computer 40, the software installer is launched.

Figure 4:
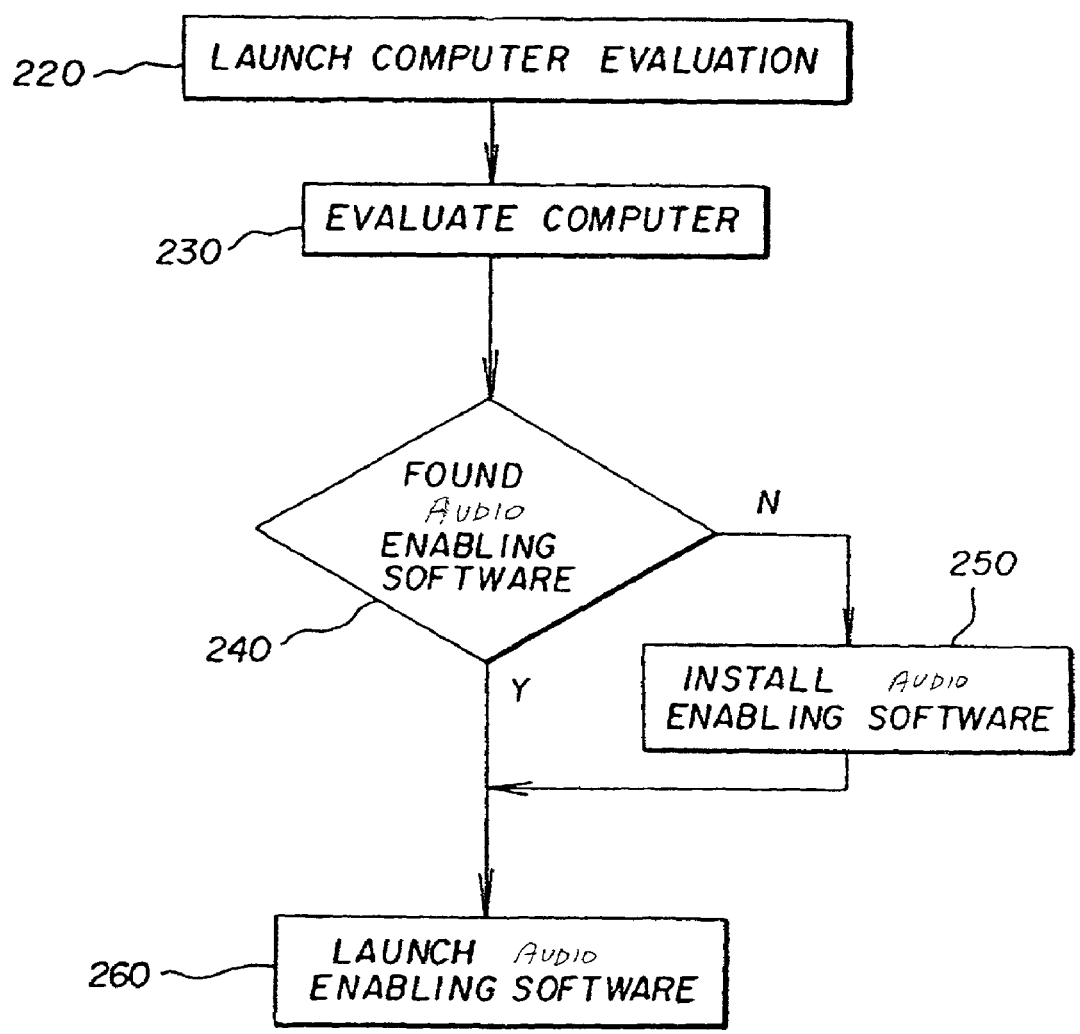
FIG. 4 is a detailed flow chart of the block 110 shown in FIG. 3.

FIG. 4 will now be discussed in detail. In block 220, the computer 40 launches the program to evaluate the computer hard drive 56. This evaluation (block 230) consists of searching the computer operating system for the existence of registry keys which indicate the location of the audio enabling software and confirming the location on the hard drive 56. A determination is made (block 240) of the existence of the audio enabling software. If the audio enabling software does not exist in hard drive 56, an installation program (block 250) will be initiated and it will install the audio enabling software. If the audio enabling software exists on the hard drive 56, or has just been installed (block 250), the audio enabling software is directly initiated (block 260). The audio enabling software enables the CPU 50 to perform the subsequent blocks (blocks 112 through 126) in FIG. 3.

Figure 5:
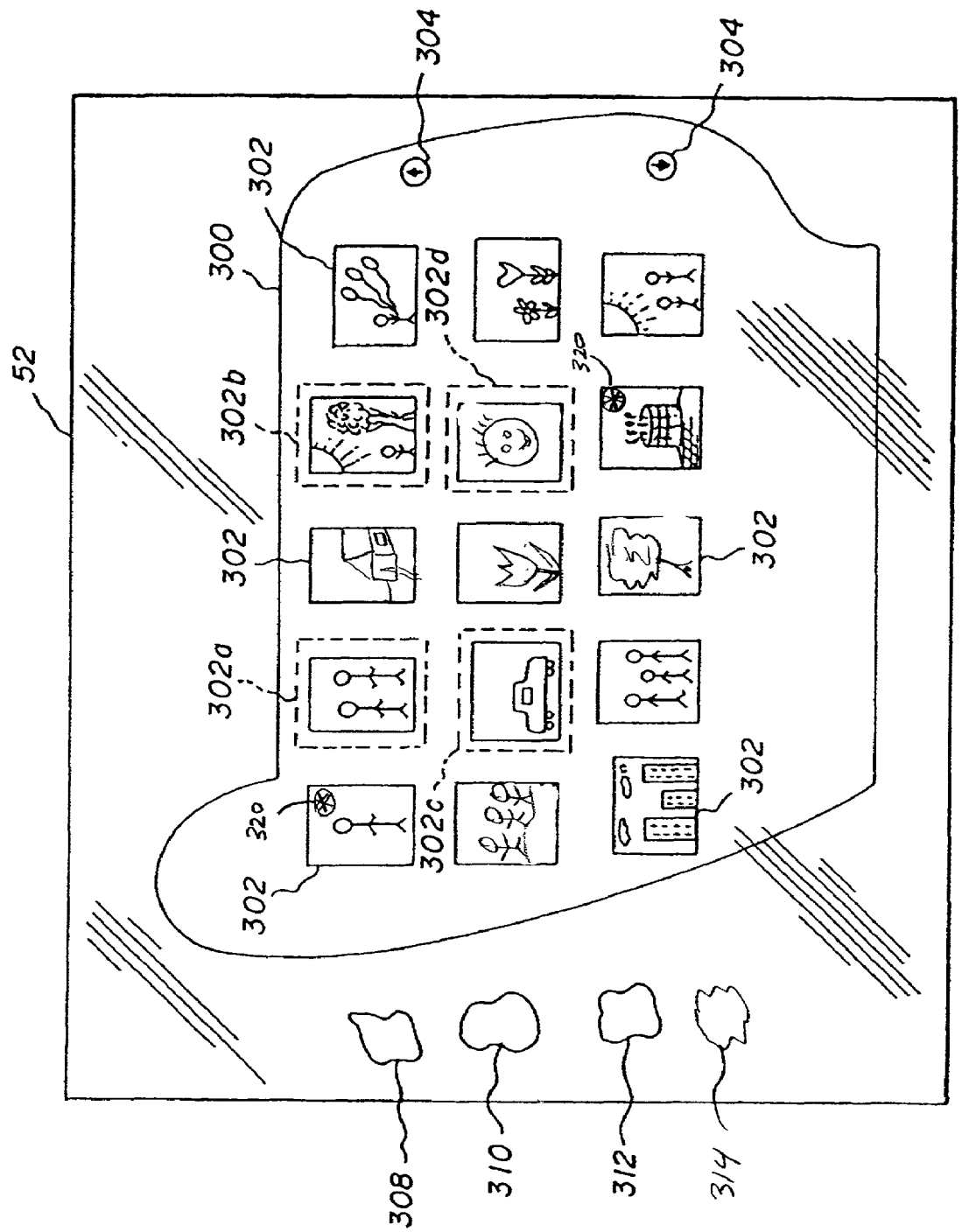
FIG. 5 is a diagram of a computer display screen for recording and playing audio information associated with digital images provided on the storage medium.

A user interface screen 300 (shown in FIG. 5) is displayed on the display screen 52 showing a two-dimensional array of thumbnail images 302 obtained from the optical disc 18. The thumbnail images 302 preferably have a lower resolution than the full size images stored on optical disc 18. In block 112, the user selects a single image, or alternatively selects multiple images (e.g., four images) by pressing either a control key (not shown) on the keyboard 54 while clicking the mouse 55 on any number of thumbnail images 302. FIG. 5 shows that four thumbnail images 302a, 302b, 302c, and 302d (which are outlined) have been selected. If the disc 18 contains a large number of thumbnail images 302, arrow controls 304 on the right portion of the "preview picture screen" 300 enable the user to scroll through the larger number of thumbnail images 302 to view a group of the thumbnail images 302 (e.g., 15 thumbnail images) at a time.

Once a thumbnail image 302 has been selected, in block 114 the user can choose to record audio for the selected image or images 302 by selecting a "record audio" icon 312. The CPU 50 then instructs the sound board 70 to record audio from the microphone 72. The audio may be recorded onto the optical disc 18 in the outer recording tracks 24 used for recording audio information using an appropriate audio file format, such as the well known RIFF/WAVE (.WAV) format. The digital image plus the recorded sound can alternatively be recorded on a separate disc, such as a separate CD-R disc or a separate floppy disk. The audio is recorded along with header information identifying the image or images with which the audio is associated. The images can be identified using an image number, image name, complete image pathname on the optical disc 18, or the like.

Once the first audio recording is completed, the user can repeat blocks 112 and 114 to record audio information for additional images. The images for which audio has been recorded are identified using a recorded audio icon 320.

To play back the recorded audio, the user interface screen 300 also includes a "play audio" icon 314. When a thumbnail image 302 is selected and the "play icon" is subsequently selected (block 116), the CPU 50 instructs the CD-R drive 44 to provide the appropriate high resolution image data from the digital image files 22 stored on optical disc 18 and to also provide the appropriate audio information file from the audio information 24 stored on optical disc 18 (block 118). The CPU displays a full size image of the user selected image on the display monitor 52, and provides the corresponding audio file to the sound board 70 which plays back the recorded audio using speakers 74.

The user interface screen 300 also includes a "slide show" icon 310. When the user selects this icon (block 120), the CPU 50 instructs the CD-R drive 44 to sequentially provide the appropriate high resolution image data from all of the digital image files 22 stored on optical disc 18 (or alternatively from a user-selected subset of the digital image files) and to simultaneously provide any corresponding audio information files from the audio information 24 stored on optical disc 18 as each image is displayed (block 122). The images are each displayed for at least a minimum period of time, if there is no corresponding audio recording or only a short audio recording. If there is a longer audio recording for a particular image, that image is displayed until the end of the audio recording. If the user selected a plurality of images for a particular audio recording in block 112, those images are automatically displayed in sequence as the audio is played back. For example, if four images were selected and the audio recording is 40 seconds long, each image is displayed for ten seconds. The CPU displays the full size images on the display monitor 52 and provides the audio files to the sound board 70 which plays back the recorded audio using speakers 74.

Figure 6:
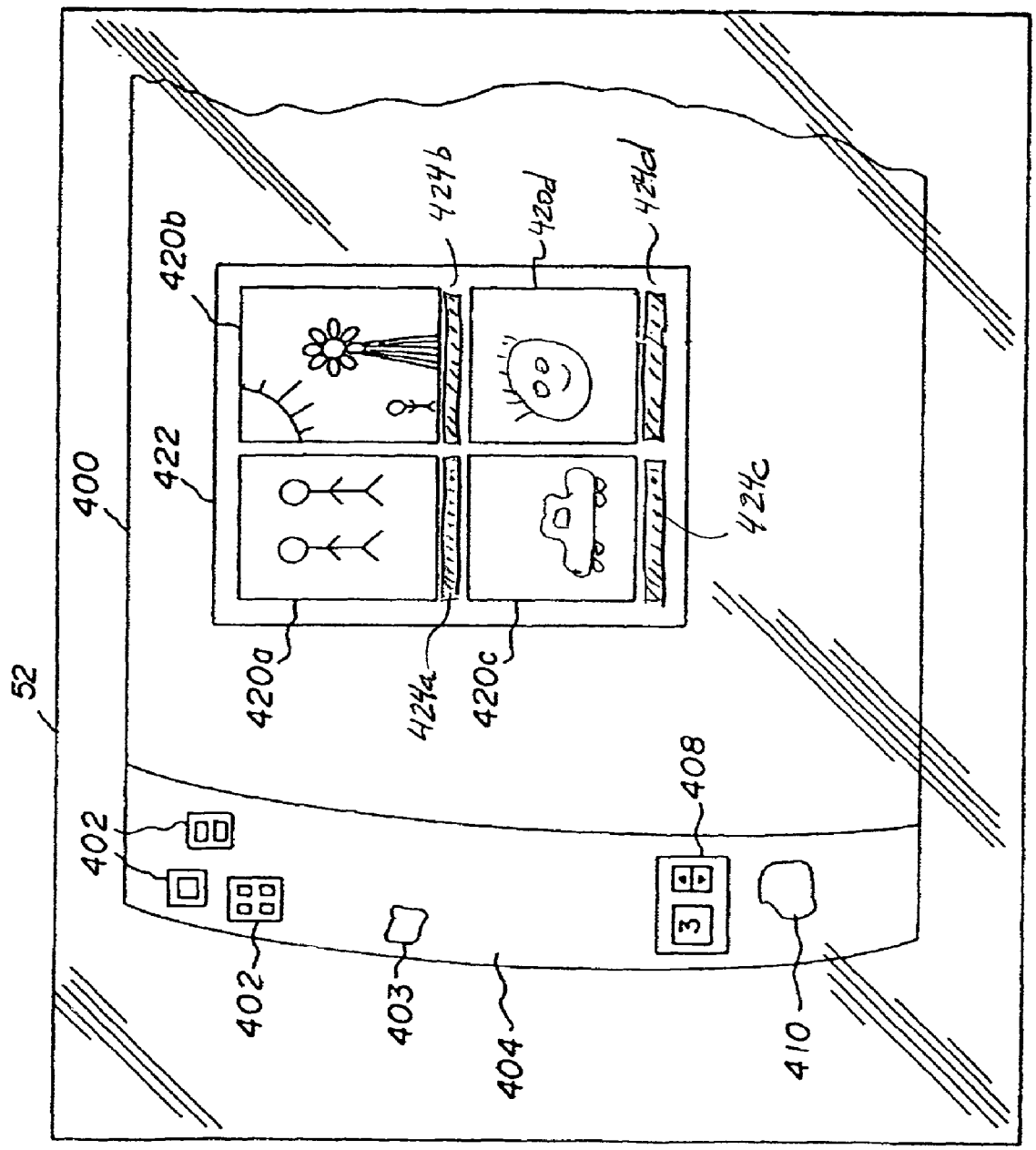
FIG. 6 is a diagram of a computer display showing a print function display screen.

The user interface screen 300 also includes a "print" icon 308. When this icon is selected by the user (block 124), the user can print all of the selected images on the local printer 58 (block 126), which can be, for example, a color ink jet printer. This brings up a "print function display screen" 400 shown in FIG. 6. The user then chooses a type of layout. The user can choose one of several predefined "layout" icons 402 on the periphery of the "print function display screen" 400 which determines how many pictures appear on each page by selecting, for example, 1, 2, or 4 images to be printed per page. Alternatively, the user can select a custom layout 403. The custom layout 403 allows the user to specify the number of columns and rows of images, the horizontal and vertical spacing between images, and the top margin and left margin of the printed page. Once a predefined layout is chosen, the images to be printed appear in a print preview area 422 on the "print function display screen" 400. In FIG. 6, the user has selected 4 images per page, and the preview area 422 displays four of the selected images, in image windows 420a, 420b, 420c, and 420d.

Next, the user chooses whether to have a machine readable data code appear under each image for which audio has been recorded, by selecting or deselecting icon 404. This data code, which can be a two-dimensional bar code, provides an encoding of the audio information, recorded in block 114, in a machine readable format that can be read, for example, by a two-dimensional barcode scanner. The sound data code can be printed using an ink jet printer manufactured by the Seiko Epson Company of Japan. The sound data code can be scanned and played by existing equipment, such as the Olympus ScanTalk device. When icon 404 is selected, the data code is shown below each image in the print layout. In FIG. 6, the user has selected 4 images per page and has selected the audio data code option. Therefore, the preview area 422 displays four of the selected images, in image windows 420*a*, 420*b*, 420*c*, and 420*d* as well as the audio data code areas 424*a*, 424*b*, 424*c*, and 424*d*.

The user then chooses the number of sets of images to print, for example, three copies of each laid out page, by typing in the number of desired sets in a print copies field 408 on the left portion of the "print function display screen" 400 by using the up and down arrow keys on the print copies field 408. After making these selections, the user can press a "print now" icon 410 and walk away from the host computer 14. Each of the selected images will be printed automatically on the local printer 58, without further user interaction.

The program prepares the printed layout by calculating the image size which enables the selected number of images to fit on a page. The image data is automatically interpolated or decimated to provide the proper image data to fill the page with the selected number of images. In this process, the program also calculates the required area needed to allow the audio data code area to be sufficient in size so that it can be read by the reading device.

While the present invention has been described in reference to a system utilizing a host computer 40, it is also applicable to systems using many other types of programmable digital imaging devices. For example, instead of using the audio enabling software with the digital computer 40, the audio enabling software may be used with a personal digital assistant (PDA), image enabled cellular telephone, or portable digital image viewer. Alternatively, the audio enabling software may be used with a digital device connected to or incorporated in a television display, such as a cable or satellite set top box. In addition to recording audio information from a microphone, music or other types of audio may be provided from various sources such as audio compact discs or digital audio files provided via the Internet, for example, MP3 files downloaded from a website specified by the audio enabling software. Furthermore, the audio enabling software may include the ability to modify or manipulate the pitch or other characteristics of the audio files to be recorded. In addition, the recorded audio information produced using the audio enabling software can be transferred, along with the digital image files, to other devices, such as other computers, set top boxes, PDAs, etc. via using a communications channel such as the Internet.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for practicing a method according to the present invention.

EXAMPLE 1

Procedure for Sound Annotation of a Digital Image File

The steps used to sound annotate a digital image file were:
1. Copy Kodak Picture Easy Software 3.0 onto an optical compact disk.
2. Scan color negative film images and copy to the same optical disk with Kodak Picture Easy Software 3.0 (Step 1).
3. Insert optical disk prepared in step 1 into a Gateway 2000 PC computer.
4. Transfer Kodak Picture Easy 3.0 Software to hard disk of Gateway 2000 PC Computer.
5. Open Kodak Picture Easy 3.0 Software and "get picture" from optical disk with scanned negative image files.
6. Open one of the digital scanned negative image files.
7. Click on the "Record Sound" button and speak into the Gateway 2000 computer microphone to annotate the picture with sound.
8. Click on the "Stop" icon when the voice message is complete.
9. Click on the "Play" icon to listen to the recorded sound now associated with the digital image file to confirm that the recorded sound is satisfactory. If the sound is not satisfactory, it may be recorded again.
10. Once the composite digital image file and associated sound file is satisfactory, it was saved by renaming the new digital image-digital sound file and saving it on the computer hard disk.
11. The new digital image-digital sound file was then written to a new optical compact disk for a future viewing and listening experience.

EXAMPLE 2

Procedure for Making a Sound Annotate Hard Copy Print

The steps for making a bard copy print from the sound annotated digital image-digital sound file were:
1. All of the steps 1–11 were followed with the additional steps which were:
   A. Open the digital image-digital sound file prepared in steps 1–11.
   B. Open print enabling printing software and print the digital image file on digital printer such as an Epson H7SDC ink jet printer or a Kodak 8600 Thermal Printer.
   C. Connect the digital sound output port from the Gateway 2000 computer to the digital sound input port of the Olympus ScanTalk L100 Printer.
   D. Press the "Play" icon in the Kodak Picture Easy 3.0 Software for the digital image-digital sound file being displayed on the computer screen. At the same time, press the record button the Olympus ScanTalk L100 Printer.
   E. Press the print button on the Olympus ScanTalk L100 device to produce a digital sound code tape that was attached to the digital print to produce a sound annotated photograph.

The invention has been described in detail with particular reference to certain preferred embodiments thereof, but it will be understood that variations and modifications can be effected within the spirit and scope of the invention.

| PARTS LIST | |
|---|---|
| 6 | digital camera |
| 10 | filmstrip |
| 12 | film scanner |
| 14 | computer workstation/host computer |
| 16 | CD recorder |
| 18 | optical disc |
| 20 | enabling software |
| 22 | digital image data |
| 24 | audio information |
| 32 | removable memory card |

-continued

PARTS LIST

| | |
|---|---|
| 40 | host computer |
| 44 | CD reader/recorder (CD-R) drive |
| 46 | floppy disc drive |
| 48 | memory card reader |
| 50 | CPU |
| 52 | display monitor |
| 54 | keyboard |
| 55 | mouse |
| 56 | hard drive |
| 58 | local printer |
| 60 | floppy disc |
| 70 | soundboard |
| 72 | microphone |
| 74 | speakers |
| 100 | block |
| 102 | block |
| 104 | block |
| 105 | block |
| 106 | block |
| 108 | block |
| 110 | block |
| 112 | block |
| 114 | block |
| 116 | block |
| 118 | block |
| 120 | block |
| 122 | block |
| 124 | block |
| 126 | block |
| 220 | block |
| 230 | block |
| 240 | block |
| 250 | block |
| 260 | block |
| 300 | user interface screen |
| 302 | thumbnail images |
| 302a | thumbnail images |
| 302b | thumbnail images |
| 302c | thumbnail images |
| 302d | thumbnail images |
| 304 | arrow controls |
| 308 | print icon |
| 310 | slide show icon |
| 312 | record audio icon |
| 314 | playback audio icon |
| 320 | recorded audio icon |
| 400 | print function display screen |
| 402 | layout icons |
| 403 | custom layout icon |
| 404 | audio data code icon |
| 408 | print copies field |
| 410 | print now icon |
| 420a | image window |
| 420b | image window |
| 420c | image window |
| 420d | image window |
| 422 | print preview area |
| 424a | audio data code area |
| 424b | audio data code area |

-continued

PARTS LIST

| | |
|---|---|
| 424c | audio data code area |
| 424d | audio data code area |

What is claimed is:

1. A method of recording audio enabling software and images on a removable storage medium, comprising the steps of:
  a) providing a plurality of digital files representing colored digital images;
  b) transferring such digital files onto the removable storage medium;
  c) providing audio enabling software and print enabling software and transferring such audio enabling software and print enabling software onto the removable storage medium; and
  d) using the audio enabling software to produce audio information and transferring such audio information onto the removable storage medium which already includes the audio enabling software and the print enabling software.

2. The method of claim 1 further including providing print enabling software for producing a print from the digital files and the audio information, wherein the print includes an audio data code area which encodes the audio information in a machine readable format.

3. The method of claim 1 wherein the removable storage medium is a write-once disc.

4. The method of claim 1 wherein the audio software is prepressed at the time the write-once disc is manufactured.

5. The method of claim 1 further including providing a computer which responds to the audio enabling software on the removable storage medium to record audio information onto the removable storage medium.

6. The method of claim 5 further including a display coupled to the computer, and the audio enabling software further enables the digital files to be viewed on the monitor and selected for audio recording.

7. The method of claim 6 wherein the audio enabling software further enables a plurality of digital files to be selected for recording a single audio recording in association with the plurality of digital files.

8. The method of claim 7 wherein the enabling software further enables the plurality of digital files to be automatically viewed in a sequence as the single audio recording is played.

* * * * *